J. LAVINE.
SOLDER FOR SOLDERING METALS.
APPLICATION FILED AUG. 5, 1916.

1,248,506.

Patented Dec. 4, 1917.

Inventor.
Jacob Lavine
by Herbert W. Jenner
Attorney.

UNITED STATES PATENT OFFICE.

JACOB LAVINE, OF LONDON, ENGLAND.

SOLDER FOR SOLDERING METALS.

1,248,506.  Specification of Letters Patent.  Patented Dec. 4, 1917.

Application filed August 5, 1916. Serial No. 113,328.

*To all whom it may concern:*

Be it known that I, JACOB LAVINE, a subject of the King of Great Britain and Ireland, residing at 143 Shaftesbury avenue, W. C., in the county of London, England, have invented certain new and useful Improvements in Solders for Soldering Metals, of which the following is a specification.

This invention relates to an improved solder for soldering metals and is intended for use in a process of gold soldering wherein the gold solder is formed in the process of soldering such as described in the specification of my former British Patent Letters No. 22,356 of 1914, the object of the present invention being to produce a solder having any required proportions of silver or silver alloy and gold or gold alloy united but not alloyed, so producing a solder suitable for the process above referred to in a concrete and commercial form.

In practice and according to one form of the invention, a sheet of silver or silver alloy and a sheet of gold or gold alloy are placed together surface to surface and suitably united preferably by means of welding, while in a modified form of the invention, a sheet silver or silver alloy is applied to both sides of the gold or gold alloy sheet and suitably united.

In a further modification of the invention, the solder may be produced in the form of a drawn wire having an inner core of gold or gold alloy and an outer covering of silver or silver alloy, again, in some forms of the solder, it may consist of a fine chain comprising gold or gold alloy and silver or silver alloy links, with links of the one alternated or interspersed with those of the other.

In all forms of the solder, the respective qualities of the gold or gold alloy and silver or silver alloy may be varied so as to produce any standard of gold solder required.

In practice the solder is used and employed in a manner exactly similar to an ordinary gold solder.

Figure 1:
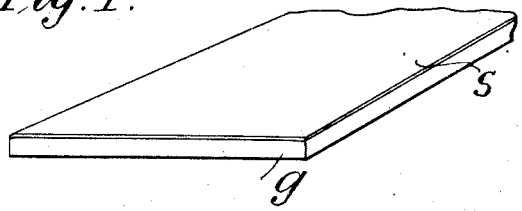
Figure 2:
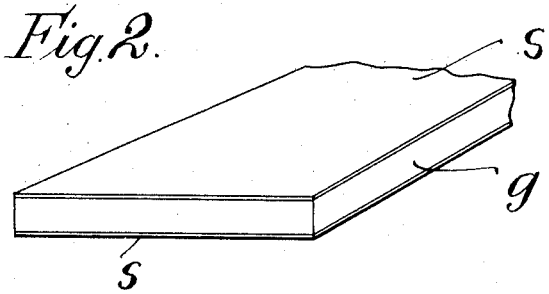
Figure 3:
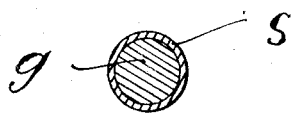
Figure 4:

In the drawings, Figure 1 is a perspective view of a plate of solder constructed according to this invention. Fig. 2 is also a perspective view, and shows a modification of the plate shown in Fig. 1. Fig. 3 is a cross-section through a wire or bar of the improved solder. Fig. 4 is a side view of a chain constructed of soldering gold and soldering silver according to this invention.

The soldering gold $g$ is permanently secured in close proximity to the soldering silver $s$ by welding or other approved way, but without alloying the two metals. The metals become alloyed and form the solder at the time of use in soldering, and the two metals are sufficiently pure to adapt them to form the solder when so alloyed together.

This solder is specially adapted for soldering nickel, and the quantity of soldering silver is small in proportion to the quantity of soldering gold. The soldering silver is arranged so as to present an exposed surface, and it may wholly inclose the soldering gold. In the process of soldering, and when heated, the soldering silver flows first, and protects the nickel surface from oxidation, while the additional heat necessary to melt the soldering gold is being applied. The two soldering metals then combine and form a gold soldered joint.

What I claim is:

1. A solder formed of a body portion of soldering gold, and a relatively small quantity of soldering silver having an exposed surface and permanently secured against the said body portion.

2. A solder formed of a relatively thick body portion of soldering gold inclosed between a relatively small outer coating of soldering silver which has an exposed surface and is permanently secured against the said body portion.

In testimony whereof I affix my signature in the presence of two witnesses.

JACOB LAVINE.

Witnesses:
 CONSTANCE MURRAY,
 CHARLES LEASON.